(12) United States Patent
Chen

(10) Patent No.: US 6,402,257 B1
(45) Date of Patent: Jun. 11, 2002

(54) WHEEL HUB FOR A BICYCLE

(75) Inventor: Hubert Chen, Taichung Hsien (TW)

(73) Assignee: Kun Teng Industry Co, Ltd., Taichung Hsien (TW)

( * ) Notice: Subject to any disclaimer, the term of this patent is extended or adjusted under 35 U.S.C. 154(b) by 0 days.

(21) Appl. No.: 09/859,327

(22) Filed: May 16, 2001

(51) Int. Cl.[7] .............................................. B60B 27/00
(52) U.S. Cl. ................................................... 301/110.5
(58) Field of Search ............................... 301/110.5, 59, 301/110.6

(56) References Cited

U.S. PATENT DOCUMENTS

| | | | | |
|---|---|---|---|---|
| 5,129,711 A | * | 7/1992 | Chen | 301/110.5 |
| 5,163,740 A | * | 11/1992 | Kawai et al. | 301/110.5 |
| 5,458,223 A | * | 10/1995 | Chen | 301/110.5 |
| 5,492,211 A | * | 2/1996 | Wu | 301/110.5 |
| 5,515,957 A | * | 5/1996 | McConaghy | 301/110.5 |
| 5,518,096 A | * | 5/1996 | Lin | 301/110.5 |
| 5,632,364 A | * | 5/1997 | Mercat | 301/110.5 |
| 6,010,197 A | * | 1/2000 | Crosnier et al. | 301/110.6 |
| 6,260,681 B1 | * | 7/2001 | Chen | 301/110.5 |
| 6,309,028 B1 | * | 10/2001 | Kanehisa et al. | 301/110.5 |

* cited by examiner

Primary Examiner—S. Joseph Morano
Assistant Examiner—Long Bao Nguyen
(74) Attorney, Agent, or Firm—Christensen O'Connor Johnson Kindness PLLC

(57) ABSTRACT

A wheel hub for a bicycle includes a hub shell with an inner wall segment within which an engaging portion of a driven cylinder is non-rotatably fitted from one end of the hub shell. A screw-threaded cylinder can enter the hub shell from the other end, and has an externally threaded shank to engage threadedly an internally threaded portion of the engaging portion, and an enlarged head which is provided with a resilient member to restrain rotatably the head relative to another inner wall segment of the hub shell during the threaded engagement. As such, the screw-threaded cylinder can be remained in the hub shell even after the driven cylinder is removed from the hub shell to prevent misplacement of the screw-threaded cylinder.

5 Claims, 4 Drawing Sheets

WHEEL HUB FOR A BICYCLE

BACKGROUND OF THE INVENTION

1. Field of the Invention

This invention relates to a wheel hub for a bicycle, more particularly to a wheel hub which includes a hub shell rotatably supported on a hub shaft, and a screw-threaded cylinder interconnecting detachably a driven cylinder and the hub shell.

2. Description of the Related Art

A conventional quick-release wheel hub for a bicycle, such as that disclosed in U.S. Pat. No. 4,580,670, includes a hub shell which is supported rotatably on a hub shaft, and a driven cylinder of a freewheel which is fitted and fixed non-rotatably to the hub shaft at one lateral side. The hub shell has an internally threaded portion. A screw-threaded cylinder has an externally threaded portion at one end for threaded engagement with the internally threaded portion, and a projection at the other end for engaging one end of the driven cylinder, thereby fixing the driven cylinder to the hub shell. However, when the driven cylinder is removed from the hub shell for replacement, the screw-threaded cylinder must be removed from the hub shell, and can be easily misplaced.

SUMMARY OF THE INVENTION

The object of the present invention is to provide a wheel hub in which a screw-threaded cylinder can be kept in an axial hole in a hub shell even after a driven cylinder has been removed from the hub shell, thereby preventing misplacement of the screw-threaded cylinder.

According to this invention, the wheel hub includes a hub shell which is adapted to be rotatably supported on an axle, and which has first and second lateral ends that are disposed opposite to each other in an axial direction, and an inner peripheral wall that extends in the axial direction around the axle to communicate the first and second lateral ends. The inner peripheral wall includes first to fifth wall segments defining different diameters. A driven cylinder is adapted to be sleeved rotatably on the axle, and has an engaging portion of such a dimension so as to be fitted to the first wall segment in the axial direction and to be non-rotatable relative to the hub shell. The engaging portion extends in the axial direction, and has an end wall, and an internally threaded portion which extends from the end wall inwardly and in the axial direction. A driving cylinder is rotatably mounted on the driven cylinder, and is adapted to be provided with a sprocket wheel. A screw-threaded cylinder can enter the second wall segment via the second lateral end, and includes a shank and a head. The shank can be fitted to the third wall segment, and extends in the axial direction to have a length longer than that of the third wall segment so as to form a projecting portion that extends beyond the third wall segment to the first wall segment. The projecting portion is provided with an externally threaded portion which engages threadedly the internally threaded portion when the engaging portion of the driven cylinder is fitted to the first wall segment. The head is disposed opposite to the shank in the axial direction, and has an outer surrounding wall which defines a diameter that is slightly smaller than the diameter of the fourth wall segment and larger than the diameter of the third wall segment. A shoulder is formed between the head and the shank, and is restrained by another shoulder between the third and fourth wall segments from moving toward the first lateral end during the threaded engagement of the externally threaded portion with the internally threaded portion. A resilient member is disposed on the outer surrounding wall of the head, and is deformable in a radial direction relative to the axle. During insertion of the screw-threaded cylinder into the axial hole via the second lateral end, when the head is forced into the fifth wall segment, the resilient member is deformed in the radial direction by the fifth wall segment so as to permit the head to slip into the fourth wall segment, where the resilient member is in contact with and is rotatable relative to the fourth wall segment.

BRIEF DESCRIPTION OF THE DRAWINGS

Other features and advantages of the present invention will become apparent in the following detailed description of the preferred embodiment of the invention, with reference to the accompanying drawings, in which.

DETAILED DESCRIPTION OF THE PREFERRED EMBODIMENT

Figure 1:
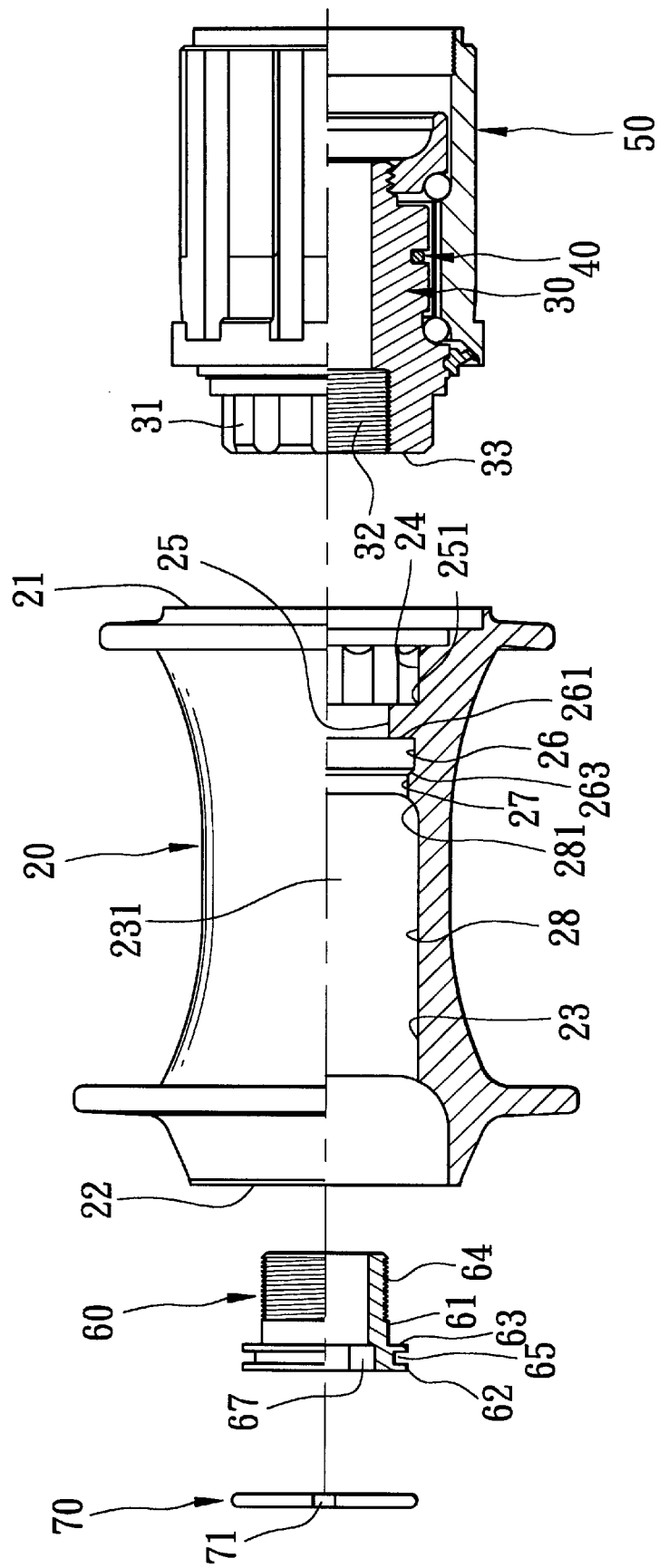
FIG. 1 is a partly sectional exploded view of a preferred embodiment of a wheel hub according to this invention.
Figure 2:
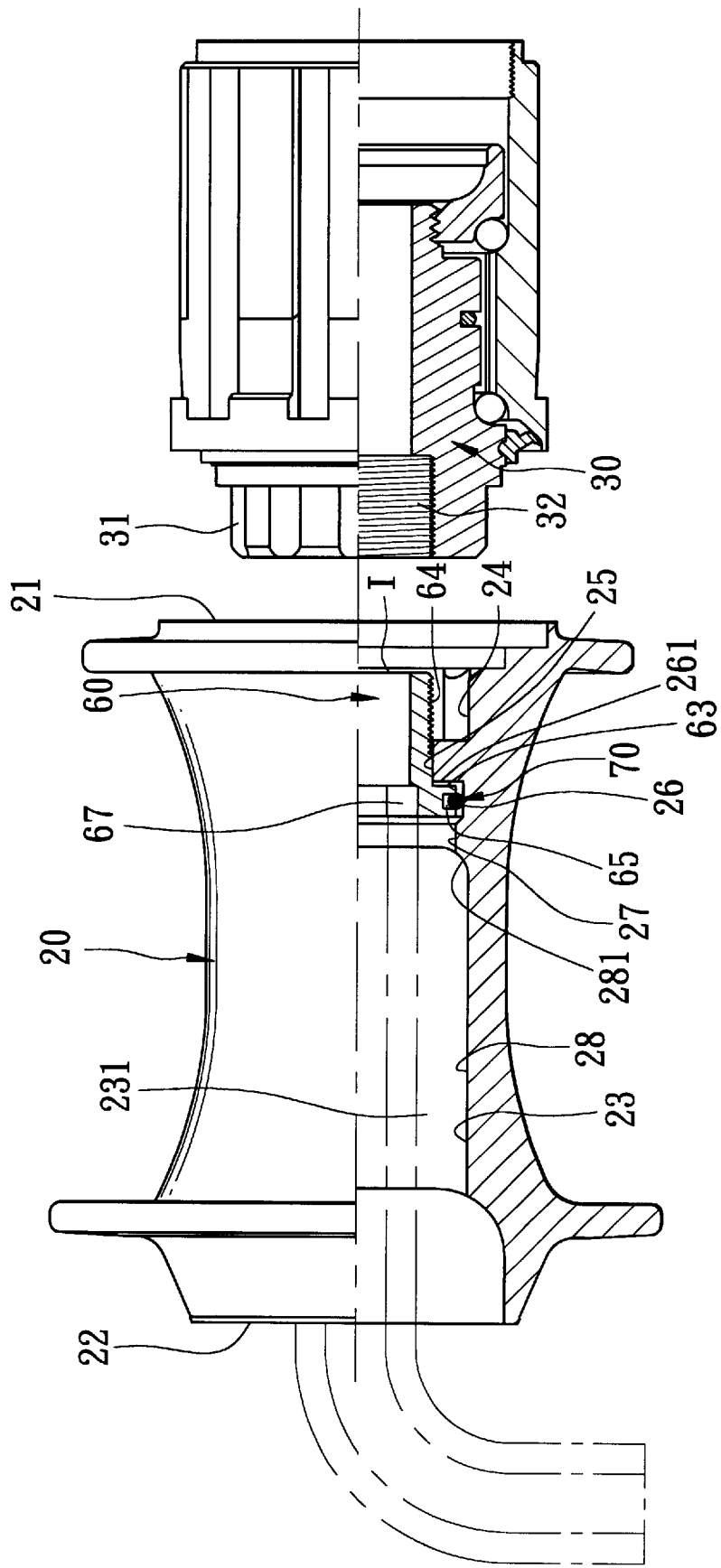
FIG. 2 is a partly sectional schematic view of the preferred embodiment to illustrate a state when a screw-threaded cylinder is received in a hub shell.
Figure 3:
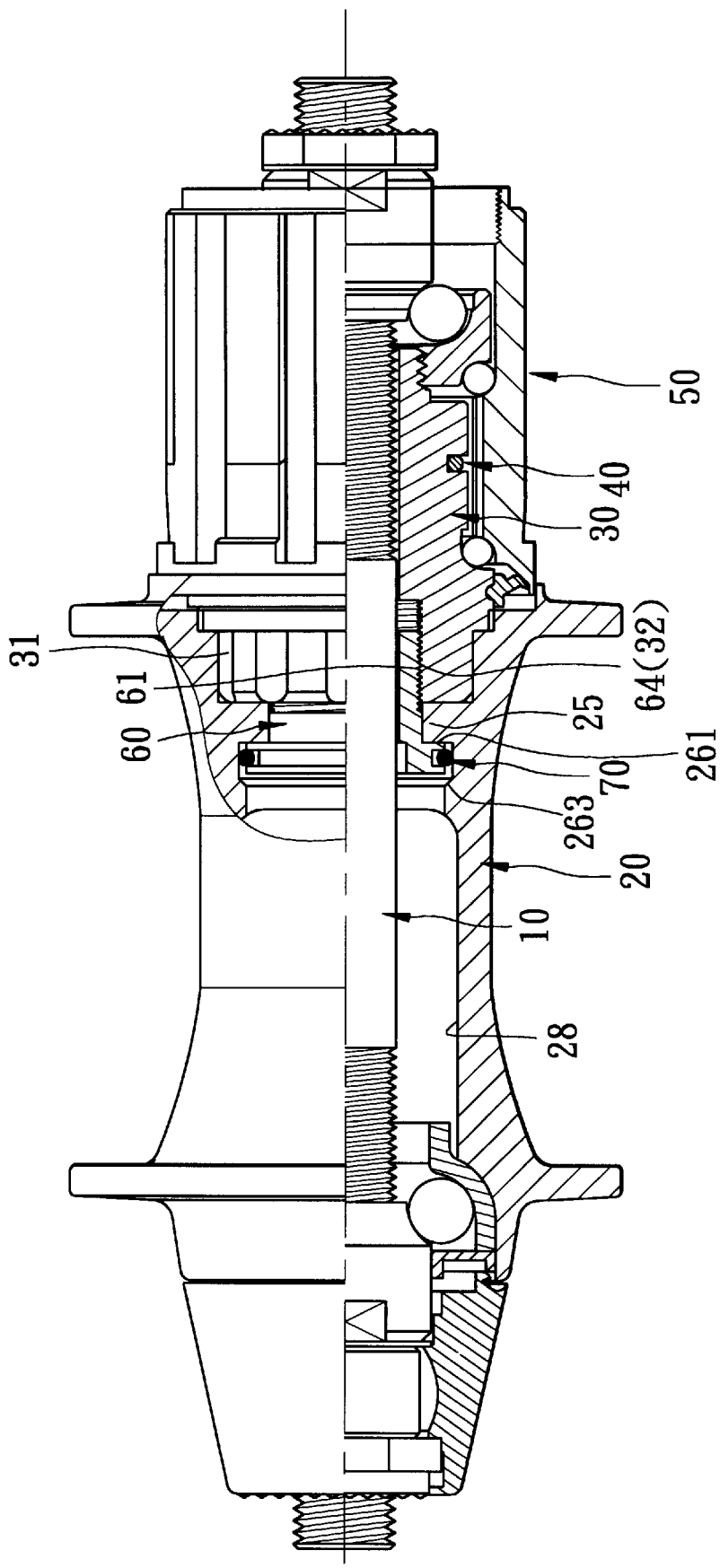
FIG. 3 is a partly sectional schematic view illustrating the preferred embodiment when mounted on an axle.

FIGS. 1, 2 and 3 show the preferred embodiment of the wheel hub for a bicycle (not shown) according to the present invention. The bicycle generally includes an axle 10 which extends in an axial direction, and a sprocket wheel (not shown) which is mounted coaxially around and rotatably relative to the axle 10. The wheel hub is shown to comprise a hub shell 20, a freewheel, a screw-threaded cylinder 60, and a resilient member 70.

The hub shell 20 is adapted to be rotatably supported on the axle 10, and has first and second lateral ends 21,22 which are disposed opposite to each other in the axial direction, and an inner peripheral wall 23 which extends in the axial direction around the axle 10 to communicate the first and second lateral ends 21,22 and which defines an axial hole 231. The inner peripheral wall 23 includes first and second wall segments 24, 28 which are disposed respectively proximate to the first and second lateral ends 21,22 and which define respectively first and second diameters, a third wall segment 25 which is disposed between the first and second wall segments 24,28 and which defines a third diameter that is smaller than the first diameter so as to form a first shoulder 251 between the first and third wall segment 24,25, a fourth wall segment 26 which is disposed between the third and second wall segments 25,28 and which defines a fourth diameter that is larger than the third diameter so as to form a second shoulder 261 between the third and fourth wall segments 25,26, and a fifth wall segment 27 which is disposed between the fourth and second wall segments 26,28 and which defines a fifth diameter that is smaller than the second and fourth diameters. A first guiding wall segment 263 is disposed between the fourth and fifth wall segments 26,27, and is inclined outwardly and in the radial direction from the fifth wall segment 27 to the fourth wall segment 26. A second guiding wall segment 281 is disposed between the fifth and second wall segments 27,28, and is inclined outwardly and in the radial direction from the fifth wall segment 27 to the second wall segment 28.

The freewheel includes a driven cylinder 30, a driving cylinder 50, and a unidirectional rotation transmission mechanism 40 which is interposed between the driven and driving cylinders 30,50.

The driven cylinder 30 is adapted to be sleeved rotatably on the axle 10, and has an engaging portion 31 of such a dimension so as to be fitted to the first wall segment 24 in the axial direction and to be non-rotatable relative to the hub shell 20. The engaging portion 31 extends in the axial direction, and has an end wall 33, and an internally threaded portion 32 which extends from the end wall 33 inwardly and in the axial direction. The driving cylinder 50 is rotatably mounted on the driven cylinder 30 by the transmission mechanism 40 in a known manner, and is adapted to be provided with the sprocket wheel.

The screw-threaded cylinder 60 is adapted to be sleeved rotatably on the axle 10, has such a dimension so as to enter the second wall segment 28 via the second lateral end 22, and includes a tubular shank 61 and a head 62. As shown in FIG. 2, the shank 61 can be fitted to the third wall segment 25, and extends in the axial direction to have a length longer than that of the third wall segment 25 so as to form a projecting portion that extends beyond the third wall segment 25 to the first wall segment 24. The projecting portion is provided with an externally threaded portion 64 which can engage threadedly the internally threaded portion 32 when the engaging portion 31 of the driven cylinder 30 is fitted to the first wall segment 24. The head 62 is disposed opposite to the shank 61 in the axial direction, and has an outer surrounding wall which defines a sixth diameter that is slightly smaller than the fourth diameter and larger than the third diameter. A third shoulder 63 is formed between the head 62 and the shank 61, and is restrained by the second shoulder 261 from moving toward the first lateral end 21 during the threaded engagement of the externally threaded portion 64 with the internally threaded portion 32. An annular groove 65 is formed in the outer surrounding wall of the head 62 and surrounds the axle 10. In addition, an operating hole 67 is formed in the head 62 and extends in the axial direction.

The resilient member 70, such as a C-shaped snap ring, is received in the annular groove 65, and has an opening 71 so as to be deformable in a radial direction relative to the axle 10. The resilient member 70 defines an outer diameter that is larger than the fifth diameter and smaller than the fourth diameter.

Figure 4:
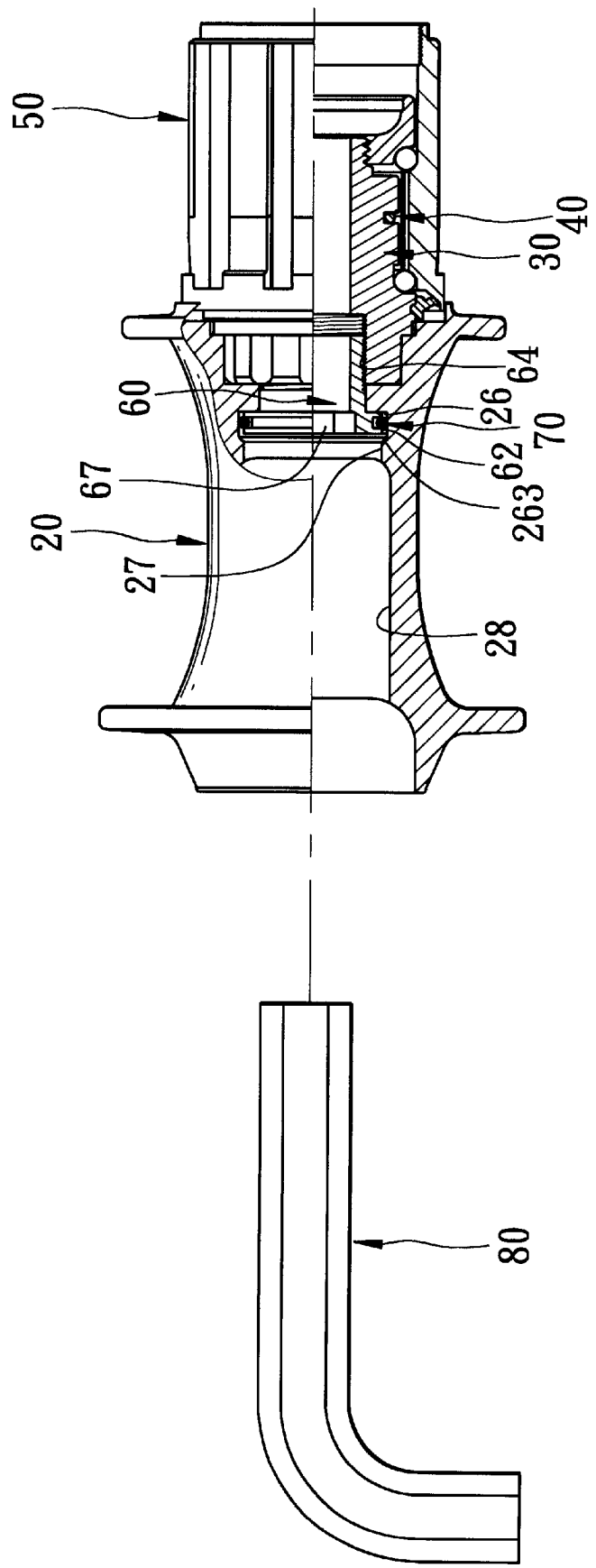
FIG. 4 is a partly sectional schematic view of the preferred embodiment to illustrate how the latter is disassembled.

As such, during assembly, the resilient member 70 is first wrapped on the head 62 of the screw-threaded cylinder 60. Then, the assembly of the resilient member 70 and the screw-threaded cylinder 60 is inserted into the axial hole 231 via the second lateral end 22. During insertion, when the head 62 is forced into the fifth wall segment 27, the resilient member 70 is deformed in the radial direction by the fifth wall segment 27 so as to permit the head 62 to slip into the fourth wall segment 26 by virtue of the guidance of the first guiding wall segment 263, where the resilient member 70 is relieved and is in contact with and is rotatable relative to the fourth wall segment 26. As shown in FIG. 2, in this state, the screw-threaded cylinder 60 has, in the axial direction, a length which is of such a dimension so as to form a clearance (I) with the first lateral end 21, thereby facilitating non-rotatable fitting of the engaging portion 31 of the driven cylinder 30 to the first wall segment 24. Subsequently, referring to FIG. 4, a hex wrench 80 is inserted into the operating hole 67 to rotate the screw-threaded cylinder 60 so as to permit the engaging portion 31 of the driven cylinder 30 to screw in by virtue of the threaded engagement between the internally and externally threaded portions 32,64.

When it is desired to remove the driven cylinder 30 from the hub shell 20 for replacement, the screw-threaded cylinder 60 is rotated by the hex wrench 80 to permit the driven cylinder 30 to screw out of the first wall segment 24 from the first lateral end 21. Thereafter, the screw-threaded cylinder 60 remains in the axial hole 231 of the hub shell 20 so as to prevent misplacement of the same.

Moreover, the screw-threaded cylinder 60 can be removed from the hub shell 20 by a pressing force which is applied on the cylinder 60 from the first lateral end 21 to permit the resilient member 70 to slip over the fifth wall segment 27 by virtue of the guidance of the first and second guiding wall segments 263,281 so as to remove the cylinder 60 from the second lateral end 22.

While the present invention has been described in connection with what is considered the most practical and preferred embodiment, it is understood that this invention is not limited to the disclosed embodiment but is intended to cover various arrangements included within the spirit and scope of the broadest interpretations and equivalent arrangements.

I claim:

1. A wheel hub for a bicycle which includes an axle extending in an axial direction, and a sprocket wheel mounted coaxially around and rotatably relative to the axle, said wheel hub comprising:

a hub shell adapted to be rotatably supported on the axle, and having first and second lateral ends which are disposed opposite to each other in the axial direction, and an inner peripheral wall which extends in the axial direction around the axle to communicate said first and second lateral ends and which defines an axial hole, said inner peripheral wall including first and second wall segments which are disposed respectively proximate to said first and second lateral ends and which define respectively first and second diameters, a third wall segment which is disposed between said first and second wall segments and which defines a third diameter that is smaller than the first diameter so as to form a first shoulder between said first and third wall segments, a fourth wall segment which is disposed between said third and second wall segments and which defines a fourth diameter that is larger than the third diameter so as to form a second shoulder between said third and fourth wall segments, and a fifth wall segment which is disposed between said fourth and second wall segments and which defines a fifth diameter that is smaller than the fourth diameter;

a driven cylinder adapted to be sleeved rotatably on the axle, and having an engaging portion of such a dimension so as to be fitted to said first wall segment in the axial direction and to be non-rotatable relative to said hub shell, said engaging portion extending in the axial direction, and having an end wall, and an internally threaded portion which extends from said end wall inwardly and in the axial direction;

a driving cylinder rotatably mounted on said driven cylinder, and adapted to be provided with the sprocket wheel;

a screw-threaded cylinder of such a dimension so as to enter said second wall segment via said second lateral end, and including a shank of such a dimension so as to be fitted to said third wall segment, and extending in the axial direction to have a length longer than that of said third wall segment so as to form a projecting portion extending beyond said third wall segment to said first wall segment, said projecting portion being provided with an externally threaded portion which engages threadedly said internally threaded portion when said engaging portion of said driven cylinder is fitted to said first wall segment, a head disposed opposite to said shank in the axial direction, and adapted to be sleeved rotatably on the axle, said head having an outer surrounding wall which defines a sixth diameter that is slightly smaller than the fourth diameter and larger than the third diameter, and a third shoulder formed between said head and said shank, and restrained by said second shoulder from moving toward said first lateral end during the threaded engagement of said externally threaded portion with said internally threaded portion; and a resilient member disposed on said outer surrounding wall of said head, and deformable in a radial direction relative to the axle such that during insertion of said screw-threaded cylinder into said axial hole via said second lateral end, when said head is forced into said fifth wall segment, said resilient member is deformed in the radial direction by said fifth wall segment so as to permit said head to slip into said fourth wall segment, where said resilient member is rotatable relative to said fourth wall segment.

2. The wheel hub of claim 1, wherein said resilient member includes a C-shaped snap ring which is wrapped around said outer surrounding wall of said head, and which defines an outer diameter that is larger than the fifth diameter so as to be deformed when said head is forced into said fifth wall segment, and that is smaller than the fourth diameter so as to be relieved when said head slips into said fourth wall segment.

3. The wheel hub of claim 2, wherein said outer surrounding wall of said head has an annular groove which surrounds the axle and which is of such a dimension so as to receive said snap ring and to permit said snap ring to deform inwardly and in the radial direction.

4. The wheel hub of claim 1, wherein said inner peripheral wall further includes a first guiding wall segment disposed between said fourth and fifth wall segments, and inclined outwardly and in the radial direction from said fifth wall segment to said fourth wall segment so as to guide the slipping movement of said head to said fourth wall segment.

5. The wheel hub of claim 1, wherein said inner peripheral wall further includes a second guiding wall segment disposed between said fifth and second wall segments, and inclined outwardly and in the radial direction from said fifth wall segment to said second wall segment.

* * * * *